United States Patent
Bechtold et al.

(10) Patent No.: US 6,830,286 B2
(45) Date of Patent: Dec. 14, 2004

(54) FIBER COMPOSITE CRASH STRUCTURE

(75) Inventors: Michael Bechtold, Moensheim (DE); Klaus Drechsler, Feldkirchen-Westerham (DE); Franz Maidl, Wallerfing (DE); Bruno Moeltgen, Tiefenbronn (DE); Frank Strachauer, Starnberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/307,323

(22) Filed: Dec. 2, 2002

(65) Prior Publication Data

US 2004/0201252 A1 Oct. 14, 2004

(30) Foreign Application Priority Data

Dec. 1, 2001  (DE) .......................................... 101 59 067

(51) Int. Cl.[7] .............................................. B60R 27/00
(52) U.S. Cl. ................................. 296/187.03; 428/36.1
(58) Field of Search ....................... 296/187.03, 187.11, 296/187.09, 187.12, 205, 203.02; 293/132, 133, 155; 188/371, 376, 377; 138/119; 428/36.1, 137

(56) References Cited

U.S. PATENT DOCUMENTS

| | | | | |
|---|---|---|---|---|
| 4,336,868 A | * | 6/1982 | Wilson et al. .............. | 293/133 |
| 4,601,367 A | * | 7/1986 | Bongers ...................... | 188/377 |
| 4,768,323 A | | 9/1988 | Coutant et al. | |
| 5,340,178 A | * | 8/1994 | Stewart et al. .............. | 293/132 |
| 5,419,416 A | * | 5/1995 | Miyashita et al. .......... | 188/371 |
| 5,688,571 A | * | 11/1997 | Quigley et al. ............. | 428/36.1 |
| 5,827,383 A | | 10/1998 | Campbell et al. | |
| 5,914,163 A | * | 6/1999 | Browne ...................... | 296/205 |
| 6,068,330 A | * | 5/2000 | Kasuga et al. .............. | 296/205 |
| 6,129,962 A | | 10/2000 | Quigley et al. | |
| 6,341,467 B1 | * | 1/2002 | Wycech ...................... | 296/204 |
| 2002/0180245 A1 | * | 12/2002 | Dogan et al. ............... | 296/205 |

FOREIGN PATENT DOCUMENTS

| | | |
|---|---|---|
| DE | 3049425 | 7/1982 |
| DE | 3744349 A1 | 7/1989 |
| DE | 38 33 048 A1 | 4/1990 |
| DE | 43 17 738 A1 | 12/1993 |
| EP | 0 683 072 B1 | 11/1995 |
| FR | 2761434 | 10/1998 |
| GB | 2319581 A | 5/1998 |
| JP | 06264949 A | 9/1994 |
| JP | 6286537 | 11/1994 |

* cited by examiner

Primary Examiner—Lori L. Coletta
(74) Attorney, Agent, or Firm—Crowell & Moring LLP

(57) ABSTRACT

A fiber composite crash structure has a hollow body which is produced entirely or partially from fiber composite material. Within the hollow body a web element is arranged running essentially in the longitudinal direction thereof. The web element is connected to the hollow body essentially in the contact region of web element and hollow body such that the structure is reinforced by reinforcing elements.

16 Claims, 2 Drawing Sheets

FIBER COMPOSITE CRASH STRUCTURE

BACKGROUND OF THE INVENTION

The present invention relates to a fiber composite crash structure for a motor vehicle longitudinal member and the like, and more particularly, to a fiber composite produced at least partially from fiber composite material.

Crash structures, deformation elements and energy absorbers are used in vehicle and aircraft construction and in train and helicopter engineering in diverse structural forms and at different points in order to increase the safety. These energy-absorbing components consist, for example, of steel or aluminum sheet or of aluminum extruded profiles. Moreover, fiber composite materials have increasingly been used recently, primarily owing to the weight-saving possibility which is associated therewith.

In motor vehicles, deformation elements having a tubular construction have proven successful in particular in the front and rear regions. A tubular structure of this type is disclosed, for example, in DE 30 49 425 A1. In this case, the crash protective component, which is designed as an open hollow body, has a circumferential surface in the form of netting made of a fiber composite strand for the irreversible absorption of energy in the event of pressure loads in the longitudinal direction. At small pressure loads in the longitudinal direction of the tube, the tube is used for an elastic, reversible support and, at relatively large loads, irreversibly absorbs energy under permanent deformation.

Furthermore, DE 38 33 048 A1 describes a bumper for motor vehicles, which has conically arranged impact tubes made of at least one fiber composite material. The impact tubes, which are arranged conically with respect to one another at a radial distance, are arranged in such a manner that their longitudinal axis extends at least approximately in the longitudinal direction of the vehicle, and therefore in the direction of travel, with the fibers being aligned at least essentially in the longitudinal direction of the tube. Glass fibers, carbon fibers or aramide fibers are used as the fibers.

In addition, DE 43 17 738 A1 discloses an energy absorber which is of cylindrical design and is composed of fiber-reinforced composite material, in which the fiber is wound at least in a circumferential direction of the body. Furthermore, the thickness of the energy absorber, which is of hollow-shaped design, is designed such that it increases gradually in at least two steps in the axial direction.

Furthermore, EP 0 683 072 B1 describes a further, hollow-shaped impact absorber which has the shape of a stepped pyramid or its circumferential surfaces are of terrace-shape design. The energy absorption takes place here predominantly by way of successive shearing processes. The material of the impact absorber consists of fiber material which has been compressed in a dimensionally stable manner.

The known arrangements largely have the disadvantage, however, that a high energy absorption capacity is possible only at a 0 degree impact. If, in contrast, the impact acts at an angle with respect to the longitudinal direction of the absorber element, then a uniform failure behavior does not occur.

It is also disadvantageous that known arrangements only have a low structural integrity. That is, the structure splits into large broken fragments during absorption of the impact energy. Broken fragments of this type constitute, however, a high injury risk and are therefore undesirable.

Furthermore, the crash behavior of the known structures can be calculated only imprecisely, and a high outlay on experimentation is required in order to predict that behavior.

In addition, in many components made of fiber composite material, the production is associated with a high proportion of manual labor, since 3D structures have to be manufactured from sheet-like semifinished fiber composite products. This entails, as a rule, not only a large amount of cutting of the sheet-like semifinished product, but also results in slow and therefore expensive manufacturing.

SUMMARY OF THE INVENTION

The present invention is based on the object of providing a fiber composite crash structure with reproducible crash behavior and optimum structure integrity which, in addition, can be produced cost-effectively.

According to a first embodiment, the object has been achieved by a fiber composite crash structure which has a hollow body produced entirely or partially from fiber composite material. The structure is distinguished according to the invention in that, within the hollow body, a web element is arranged running essentially in the longitudinal direction thereof. The web element is connected to the hollow body essentially in the contact region of web element and hollow body in such a manner that the structure is reinforced by reinforcing elements.

In this embodiment, the hollow body has any desired cross section. It is expedient, however, for the cross section to have an oblong, oval, elliptical, circular or polygonal shape.

A second embodiment of the fiber composite crash structure according to the invention, in which the web element can be omitted, is distinguished in that the hollow body has a circular cross section. Reinforcing elements are introduced into the hollow body wall in order to reinforce the structure.

In addition to the weight reduction, the crash structure according to the invention made of fiber composite material has the advantage of a high specific energy absorption. Even in the case of an oblique impact, the component has high structural integrity and optimum crash behavior. In addition, the absorption behavior can be readily predicted and adapted in a simple manner to desired requirements.

The reinforcing elements are advantageously arranged running essentially in the thickness direction of the hollow body wall. Owing to the orientation of the reinforcing elements, the shock acting on the structure is optimally absorbed and, in particular, the absorption of energy in the case of an oblique impact is substantially improved. In addition, a structure reinforced in such a manner has a better structural integrity. As a result, in the event of a crash, spitting off or spitting up of broken fragments is avoided.

Furthermore, it is expedient to arrange the reinforcing elements in a manner such that they run entirely or in sections in the circumferential direction of the hollow body and along the longitudinal direction thereof.

It is particularly advantageous that the distance between the reinforcing elements both in the circumferential direction of the hollow body and in the longitudinal direction thereof can be set in a variable manner in order to adapt the energy absorption capability of the structure. That is, the absorption behavior can be adapted in a simple manner, by varying the density of the reinforcing elements to a desired force/distance profile. It is advantageous in this respect, since in contrast to known structures, no new design, and therefore also no new tools for producing the structure, are required when adapting the absorption behavior. This constitutes an extremely effective form of adaptation saving on both costs and time.

The reinforcing elements are expediently sewn into the hollow body wall by tufting, and the web element and the hollow body are sewn to each other essentially in the contact region by tufting. The sewing process has the advantage of easy handling capability. In addition, it can easily be integrated in automated production sequences. Thereby, at least partially automated manufacturing is possible, so that shorter manufacturing times and lower outlay on personnel are required, which results in a significant cost reductions.

The reinforcing elements are expediently sewing threads comprising glass and aramide fibers, the use of glass fibers being more cost-effective.

Moreover, it is advantageous that the hollow body has a conical shape in the longitudinal direction and has a variable wall thickness which is of step-shaped design in the longitudinal direction. As an alternative, the hollow body can have a wall thickness continuously increasing in the longitudinal direction. As a result, the level of maximum force application is set in a known manner, so that a restraint system is realized using simple techniques.

According to a particularly currently preferred embodiment, the hollow body comprises a fiber composite mesh. The use of a fiber composite mesh is expedient owing to the manufacturing which is close to final contours and is automated. In this case, cutting, as is the case, for example, when other 2D multiaxial structures or fabrics are used, scarcely occurs, so that the material costs are reduced. The partially automated manufacturing also results in shorter manufacturing times with a lower outlay in personnel.

In the case of the embodiment having a web element, the latter expediently has a double T-profile. The T-shaped sections of the web element are connected to one another via a central region, and the T-shaped sections connecting the more closely adjacent, opposite side surfaces of the hollow body to each other. Great stability is thereby imparted to the crash structure.

It is furthermore advantageous that the web element, like the hollow body, consists of fiber composite material. In this case, it is particularly expedient that the web element consists of a sewn-up multiaxial structure, with the fiber alignments of the multiaxial structure having an angle of 45° with respect to the longitudinal extent. The use of a multiaxial structure makes possible an arrangement in which the force lines are so orientated. The 45° orientation results in optimum sheer strength and ensures complete functioning capability of the entire system even in the case of an angular impact (oblique impact). In addition, a T-profile web of this type comprising a multiaxial structure can be produced relatively simply and cost-effectively.

The crash structure according to the invention is preferably used as a crash longitudinal member in a passenger vehicle. Moreover, the fiber composite crash structure can be used as a deformation element in an aircraft, a helicopter or a rail vehicle.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
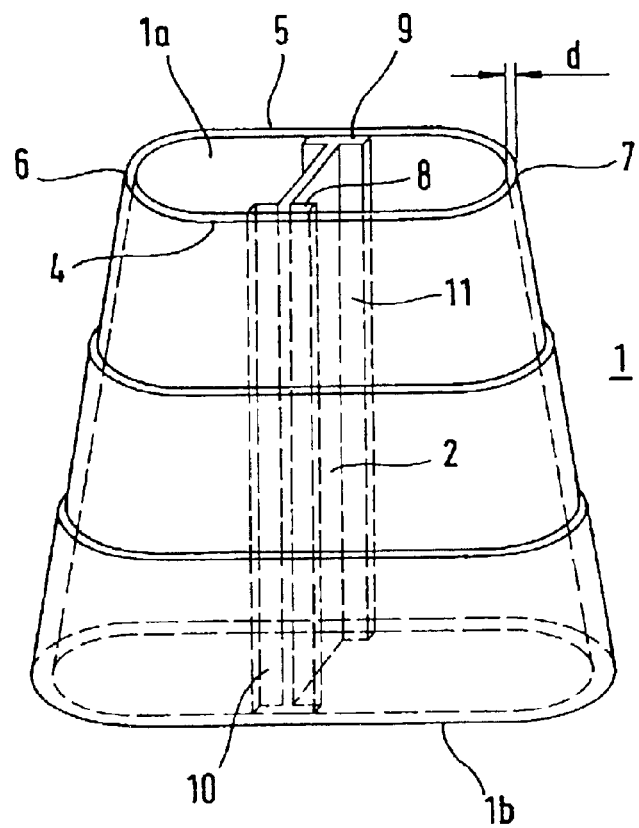
FIG. 1 is a schematic, perspective view of a first embodiment of the fiber composite crash structure according to the present invention.

FIG. 1 shows, in a perspective illustration, a first embodiment of the fiber composite crash structure according to the invention. The fiber composite crash structure comprises a hollow body 1 made of fiber composite material. The hollow body 1 preferably has a conical shape and consists of a fiber mesh which is produced, for example, with the aid of a circular braiding machine. The mesh is usually placed onto a suitably shaped mandrel (not illustrated). Of course, the hollow body may also be produced from other fiber composite materials or using other techniques.

The wall thickness d of the embodiment illustrated in FIG. 1 is of step-shaped or terrace-shaped design. In this case, the thickness d of the hollow body wall increases in sections from the conically tapering side 1a to the widened side 1b, it being preferable, for manufacturing reasons, for only the outer wall to be thicker in some sections, as illustrated in FIG. 1, since the inside of the hollow body 1 bears continuously against the mandrel (not illustrated) during production, for example by way of braiding. The increase in wall thickness d in some sections sets the respective level of maximum force application, as a result of which a restraint system is essentially realized. In addition, a hollow body having a constant or continuously increasing wall thickness may also be used in the same manner. The above-mentioned examples are used merely for explanation and are not intended to constitute any restriction on the scope of the present invention.

The hollow body in FIG. 1 has an oblong cross section, as viewed in the X-Y plane, two side surfaces 4 and 5, which run essentially parallel, being connected to each other via curved regions 6 and 7. The distance between the opposite side surfaces 4, 5 is substantially smaller than that between the opposite curved regions 6, 7. As an alternative, the cross section of the hollow body may be of elliptical or oval design. In that case, like the side surfaces 6, 7, the side surfaces 4, 5 are of curved design, but the radius of curvature of the side surfaces 4, 5 is substantially larger than that of the side surfaces 6, 7. In addition, other suitable cross sections may also be used depending in each case on the space which is available.

FIG. 1 furthermore shows that a web element 2 which extends essentially in the longitudinal direction is arranged in the interior of the hollow body 1. The longitudinal direction corresponds to the direction indicated in FIG. 1 by arrow Z. The web element 2 has a double T-profile, the T-shaped sections 8, 9 of the web element 2. The sections 8, 9 are in contact with the side surfaces 4, 5, respectively, of the hollow body 1. The sections 8, 9 of the web element 2 are in contact with the inner surface of the hollow body 1, so that a contact region 10 is produced in the region of the side surface 4 and a contact region 11 is produced in the region of the side surface 5. The contact regions 10, 11 extend over the entire longitudinal direction Z of the web element 2.

Figure 2:
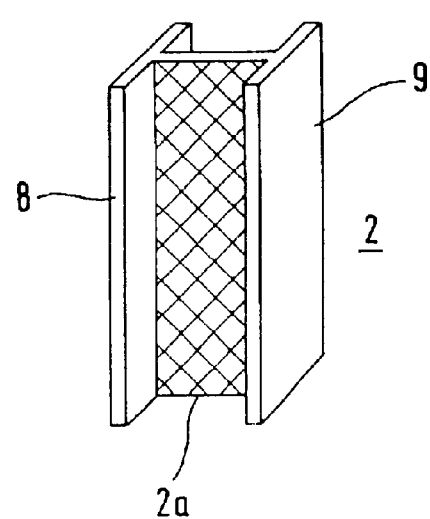
FIG. 2 is a perspective view of a web element arranged within the hollow body.

In FIG. 2, the web element 2 is shown separately in a perspective illustration. The sections, of T-shaped design, of the web element 2 are again denoted by reference numbers 8, 9. Like the hollow body 1, the web element 2 is produced from a fiber composite material. The web element 2 preferably consists of a sewn-up multiaxial structure, the fibers of which are in each case preferably aligned at a 45° angle with respect to the longitudinal direction Z. The 45° alignment of the fibers is indicated schematically in FIG. 2 for the central region 2a connecting the T-shaped sections 8, 9. An identical fiber alignment can be used for the T-shaped sections 8, 9. Such an alignment of the fibers is particularly suitable in an oblique impact for absorbing the energy of the crash element according to the invention. Of course, the alignment of the fibers can be adapted as desired to other force applications.

Figure 3:
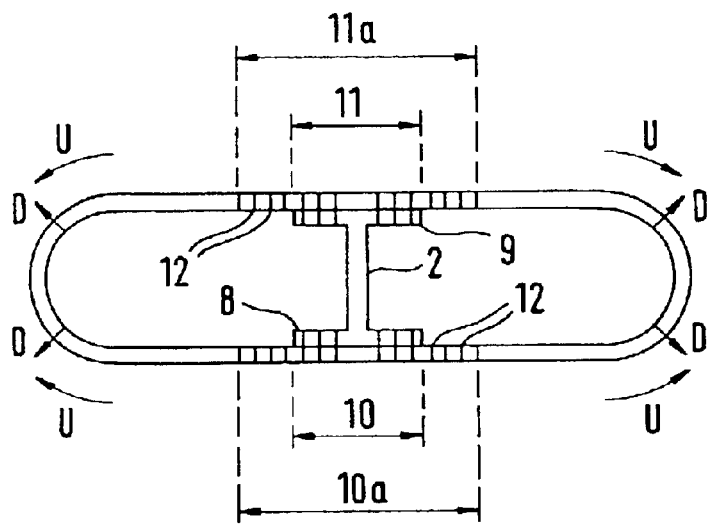
FIG. 3 is a schematic cross-sectional view of the fiber composite crash structure illustrated in FIG. 1.

FIG. 3 is a cross-sectional view in the X-Y plane of the fiber composite crash structure illustrated in FIG. 1. The web element 2 is sewn up with its T-shaped sections 8, 9 inside of the hollow body 1 and in contact with the walls of the hollow body 1. By way of the sewing up, which takes place primarily in the contact regions 10, 11, which run essentially in the Z-direction, reinforcing elements 12 are introduced into the structure. The sewing up may also be expanded in each case, however, in the circumferential direction beyond these regions, which is indicated in FIG. 3 schematically by an expanded region 10a, 11a. The circumferential direction is indicated in FIG. 3 schematically by arrows U. Of course, the reinforcing elements 12 introduced in the form of sewing threads may also be arranged over the entire circumference of the hollow body 1. In this case, the so-called expanded regions correspondingly extend over the entire circumference.

The sewing up preferably takes place by tufting. This has the advantage that no entanglement is produced on the sewing rear side, i.e. on the inside of the hollow body. The reinforcing elements or sewing threads 12 are introduced in a virtually pin-shaped manner into the contact regions 10, 11 or 10a, 11a in the manner running perpendicular with respect to the outer wall of the hollow body 1. Consequently, the reinforcing elements 12 run essentially in the thickness direction of the hollow body wall. The thickness direction is indicated in FIG. 3 by arrows D, i.e., that direction thus runs in the X-Y plane.

Glass fibers or aramide fibers are typically used as sewing threads. Owing to the fibers running in the thickness direction D, the energy absorption behavior of the fiber composite crash structure is substantially improved and optimized. In addition, the provision of the reinforcing elements avoids a delamination of web elements 2 and hollow body 1 in the event of a crash. This means that the crash structure according to the invention has a high structural integrity, i.e. no splitting of large broken fragments occurs in the event of a crash. A uniform crumbling of the structure produced from fiber composite material takes place. Owing to the fiber reinforcement, a high specific energy absorption with optimum crash behavior is therefore obtained.

Figure 4:
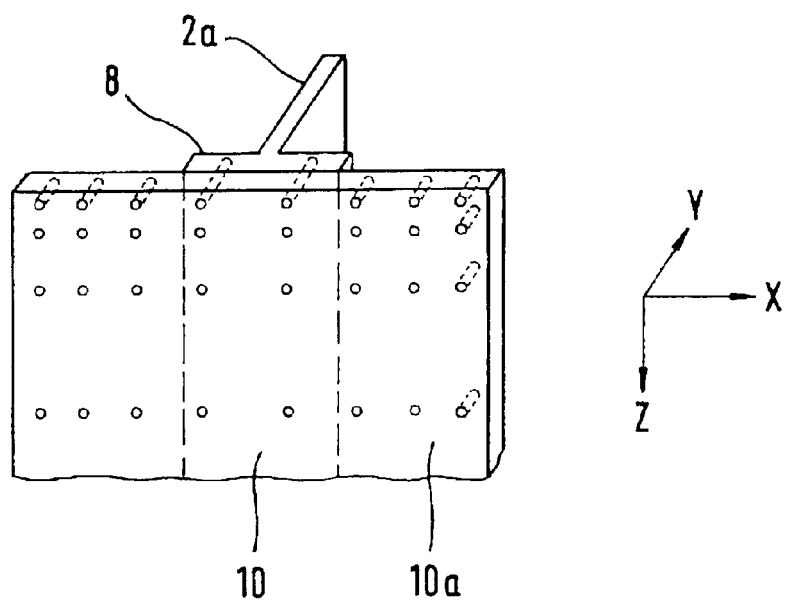
FIG. 4 is an enlarged perspective detail of the contact region between web element and hollow body.

It should furthermore be noted that the crash behavior can be adapted or varied in a simple manner, for example by changing the distance between the stitches. This results in a different density of the fibers running in the thickness direction. In other words, owing to the change in the distance between the fibers, the absorption behavior of the crash element according to the invention can be adapted in a simple manner. This is advantageous in this respect, because in the case of previous crash structures, a new design is required for a renewed optimization, and therefore new production tools are also required, which requires a large outlay on production and therefore also a long processing cycle. In contrast, in the case of the structure according to the present invention, the shape of the hollow body and of the web element can be retained. Only the distance between the fibrous reinforcing elements 12 is varied. The variation of the mutual spacing between the individual fibers may, of course, be varied both in the Z-direction and in the circumferential direction U. This is illustrated schematically in FIG. 4, in which the contact region 10 and the expanding contact region 10a are illustrated on an enlarged scale in a perspective illustration. Of course, in addition to the density variation illustrated in FIG. 4, any other desired variations can also be selected, depending on the particular requirements of each case.

In addition, the fiber composite crash structure according to the invention has the advantage that it can be produced cost-effectively. First, the web element is, as already described, produced from, for example, a sewn-up multiaxial structure. Subsequently, the web element 2 is held by correspondingly shaped cores. The outer circumference of the cores is configured in such a manner that it corresponds to the conical shape of the hollow body 1 and serves as a mandrel for the next processing step. The hollow body is then placed onto this mandrel, which consists of the core elements, by way of braiding. The braiding can take place with, for example, a circular braiding machine. The web element is subsequently sewn up to the hollow body as described above. In the process, the mandrel can either remain within the hollow body, which is recommended in particular for subsequent transportation, but it may also be removed. The mandrel is removed before the final impregnation of the fiber composite crash structure. The impregnation process takes place, for example, by RTM (reaction transfer molding) or by RI (resin injection).

It should finally be noted that, according to a further embodiment, the hollow body has a circular cross section so that, if appropriate, the web element may be omitted. In this embodiment, the reinforcing elements which run in the thickness direction and are arranged in the circumferential direction U and in the longitudinal direction Z, are introduced into the hollow body wall by sewing at desired points. Otherwise, the second embodiment does not differ from the first embodiment described in conjunction with FIGS. 1–4.

The fiber composite crash structure according to the present invention is used in particular as crash longitudinal members in passenger vehicles. In addition, use may also be made of other hollow body shapes which are used in a similar manner, for example as a deformation element in aircraft engineering, helicopter engineering or in rail vehicles.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. Fiber composite crash structure, comprising a hollow body produced at least partially from fiber composite material, and a web element arranged with the hollow body to extend in a substantially longitudinal direction thereof, wherein the web element is connected to the hollow body substantially in a contact region of the hollow body on a wall of which reinforcing elements are provided to reinforce the structure, the web element being sewn by tufting to the hollow body in the contact region.

2. Fiber composite crash structure according to claim 1, wherein the reinforcing elements are arranged to extend substantially in a thickness direction of the hollow body wall.

3. Fiber composite crash structure according to claim 1, wherein the reinforcing elements are to extend running entirely or in sections in a circumferential direction of the hollow body and along the longitudinal direction thereof.

4. Fiber composite crash structure according to claim 1, wherein a distance between the reinforcing elements in the circumferential direction and in the longitudinal direction of the hollow body is variable to adjust energy absorption capability of the structure.

5. Fiber composite crash structure according to claim 1, wherein the reinforcing elements are sewn by tufting into the hollow body wall.

6. Fiber composite crash structure according to claim 1, wherein the reinforcing elements are sewing threads comprising glass fibers or aramide fibers.

7. Fiber composite crash structure according to claim 1, wherein the hollow body comprises an oblong, oval, elliptical, circular, or polygonal cross section.

8. Fiber composite crash structure according to claim 1, wherein the hollow body has a conical shape in the longitudinal direction.

9. Fiber composite crash structure according to claim 1, wherein the hollow body has a step-shaped variable wall thickness in the longitudinal direction.

10. Fiber composite crash structure according to claim 1, wherein the hollow body has a wall thickness increasing continuously in the longitudinal direction.

11. Fiber composite crash structure according to claim 1, wherein the hollow body is a fiber composite mesh.

12. Fiber composite crash structure according to claim 1, wherein the web element comprises a double T-profile, in which T-shaped sections of the web element are connected to each other via a central region.

13. Fiber composite crash structure according to claim 12, wherein the T-shaped sections of the web element connect the more closely adjacent, opposite side surfaces of the hollow body to each other.

14. Fiber composite crash structure according to claim 1, wherein the web element consists of a fiber composite material.

15. Fiber composite crash structure according to claim 1, wherein the web element is a sewn-up multiaxial structure.

16. Fiber composite crash structure according to claim 15, wherein the multiaxial fabric has a fiber alignment of 45° with respect to the longitudinal direction of the web element.

* * * * *